(12) United States Patent
Yoshioka

(10) Patent No.: US 8,030,860 B2
(45) Date of Patent: Oct. 4, 2011

(54) WORKING VEHICLE

(75) Inventor: Masao Yoshioka, Nagano (JP)

(73) Assignee: Takeuchi Mfg Co., Ltd. (JP)

( * ) Notice: Subject to any disclaimer, the term of this patent is extended or adjusted under 35 U.S.C. 154(b) by 395 days.

(21) Appl. No.: 12/301,300

(22) PCT Filed: May 24, 2007

(86) PCT No.: PCT/JP2007/061031
§ 371 (c)(1),
(2), (4) Date: Nov. 18, 2008

(87) PCT Pub. No.: WO2007/139167
PCT Pub. Date: Dec. 6, 2007

(65) Prior Publication Data
US 2009/0173554 A1    Jul. 9, 2009

(30) Foreign Application Priority Data
Jun. 1, 2006 (JP) .................................. 2006-153698

(51) Int. Cl.
*H02K 23/66* (2006.01)
*H02J 7/00* (2006.01)
*H02H 7/18* (2006.01)

(52) U.S. Cl. ........ 318/139; 318/434; 320/132; 320/134; 290/7; 290/4 R

(58) Field of Classification Search ............... 318/3, 139, 318/140, 432, 434, 798, 801; 180/65.24, 180/65.29, 312; 290/7, 4 R, 40 B, 40 C; 320/132, 134; 701/50
See application file for complete search history.

(56) References Cited

U.S. PATENT DOCUMENTS

| 6,457,351 | B1 * | 10/2002 | Yamamoto | ................. 73/116.05 |
| 7,100,721 | B2 * | 9/2006 | Atarashi et al. | .......... 180/65.235 |
| 2003/0097837 | A1 * | 5/2003 | Hiraki et al. | .................... 60/486 |

(Continued)

FOREIGN PATENT DOCUMENTS

EP     1589211 A1    10/2005

(Continued)

OTHER PUBLICATIONS

International Search Report for PCT/JP2007/061031 mailed on Sep. 4, 2007 (English Translation).

*Primary Examiner* — Eduardo Colon-Santana
(74) *Attorney, Agent, or Firm* — Studebaker & Brackett PC; Donald R. Studebaker

(57) ABSTRACT

A power shovel vehicle including a hydraulic pump that outputs hydraulic oil for operating a hydraulic actuator, an electric motor for driving the hydraulic pump, a main battery for supplying direct current electric power, an inverter for converting the direct current electric power into alternating current electric power and operating the electric motor, a second relay for making and breaking the connection between the main battery and the inverter, an operating device for operating the hydraulic actuator, a controller for controlling operation of the hydraulic actuator and inverter, and turning on and off the second relay, a first relay for making and breaking the connection between the main battery and the controller, a power source monitoring controller for monitoring conditions of the main battery and turning on and off the first relay, a hydraulic sensor for detecting the discharge pressure of the hydraulic pump, and an electric current sensor for measuring a load current flowing into the inverter.

3 Claims, 4 Drawing Sheets

U.S. PATENT DOCUMENTS

| | | | |
|---|---|---|---|
| 2005/0234622 A1* | 10/2005 | Pillar et al. | 701/41 |
| 2005/0246082 A1* | 11/2005 | Miki et al. | 701/50 |
| 2006/0200292 A1 | 9/2006 | Askage | |
| 2009/0025990 A1* | 1/2009 | Futahashi et al. | 180/65.2 |
| 2009/0261761 A1* | 10/2009 | Yoshioka | 318/139 |
| 2010/0075798 A1* | 3/2010 | Suzuki et al. | 477/5 |

FOREIGN PATENT DOCUMENTS

| | | |
|---|---|---|
| JP | 09-046816 | 2/1997 |
| JP | 2004-225355 | 8/2004 |
| JP | 2004-251278 | 9/2004 |
| JP | 2004-300947 | 10/2004 |
| WO | 2004-067939 A1 | 8/2004 |

* cited by examiner

WORKING VEHICLE

TECHNICAL FIELD

The present invention relates to a working vehicle having an electric motor driven by a battery as the drive power source.

TECHNICAL BACKGROUND

In conventional working vehicles the drive power source is normally an engine. However, in circumstances in which an engine cannot be used, such as in an underground construction site, construction machinery with an electric motor as the power source is used (see for example Japanese Patent Application Laid-open No. 2004-225355). The power source for the electric motor is a commercial power supply, or a battery on the construction machinery that is charged from a commercial power supply.

DISCLOSURE OF THE INVENTION

Problems to be Solved by the Invention

However, in this type of working vehicle when the electric motor is driven by a battery, there is the problem that if it is necessary to frequently charge the battery, the operation efficiency becomes poor. Therefore it is necessary to operate the working vehicle without charging the battery during a working period of at least one day.

With the foregoing in mind, it is an object of the present invention to provide a working vehicle constituted to prevent consumption of electric power from the charged battery when the hydraulic actuator of the like is not being operated.

Means to Solve the Problems

To resolve the above problem, the working vehicle according to the present invention (for example, the crawler type power shovel 1 according to the embodiments) is a working vehicle operated by a hydraulic actuator, the working vehicle comprising: a hydraulic pump that outputs hydraulic oil for operating the hydraulic actuator; an electric motor that drives the hydraulic pump; a main battery that supplies direct current electric power; an inverter that operates the electric motor by converting the direct current electric power from the main battery into alternating current electric power and supplying the alternating current electric power to the electric motor; an electric motor relay for making and breaking the connection between the main battery and the inverter (for example, the second relay 47 according to the embodiments); an operating device for operating the hydraulic actuator; a controller which is operated by the direct current electric power from the main battery, and which controls the operation of the hydraulic actuator and the inverter in accordance with operation signals output from the operation device, and makes and breaks the connection between the main battery and the inverter in use of the electric motor relay; a controller relay for making and breaking the connection between the main battery and the controller (for example, the first relay 46 according to the embodiments); a power source monitoring controller that monitors the state of the main battery, and that makes and breaks the connection between the main battery and the controller using the controller relay; an oil pressure sensor for measuring the output oil pressure of the hydraulic oil output from the hydraulic pump; and a current sensor for measuring the value of the load current flowing from the main battery to the inverter. For the working vehicle, configuration is employed to execute: a first step in which the controller, when determination is made that there has been no variation in the magnitude of the output oil pressure measured by the oil pressure sensor and the load current measured by the current sensor within a set period of time, breaks the connection between the main battery and the inverter and stops the motor in use of the electric motor relay; a second step in which the controller, when determination is made that the state where no operating signal has been output from the operating device has continued during a predetermined set period of time, transmits a command signal to the electrical power monitoring controller; and a third step in which the power source monitoring controller, when the transmitted signal is received, breaks the connection between the main battery and the controller in use of the controller relay, and stops the controller.

In the working vehicle according to the present invention, preferably the controller has a motor start up switch, and in the second step, the controller, when determination is made that the motor start up switch has been operated, connects the main battery and the inverter in use of the electric motor relay, and starts the electric motor in order to return to the first step.

Also, in the working vehicle according to the present invention, preferably the power source monitoring controller has a power supply switch, and in the third step, after stopping the controller, the power source monitoring controller, when determination is made that the power supply switch has been operated, connects the main battery to the controller and the inverter using the controller relay and the electric motor relay in that order

Advantageous Effects of the Invention

When the working vehicle according to the present invention is constituted as described above, the supply state of hydraulic oil to the hydraulic actuator and the manipulation state of the operating device are monitored by the controller, and when oil pressure is not necessary the electric power supply to the inverter is stopped, and further the electric power supply to the controller is stopped, so unnecessary power consumption from the main battery is minimized and it is possible to lengthen the time that the power shovel can carry out work without charging the main battery unit. Even when the power supply to the inverter and the controller is stopped in this way, by pressing the motor start up switch or the power supply switch, it is possible to simply supply electric power to the inverter and the controller.

DESCRIPTION OF THE PREFERRED EMBODIMENTS

The following is an explanation of the preferred embodiments of the present invention with reference to the drawings.

Figure 1:
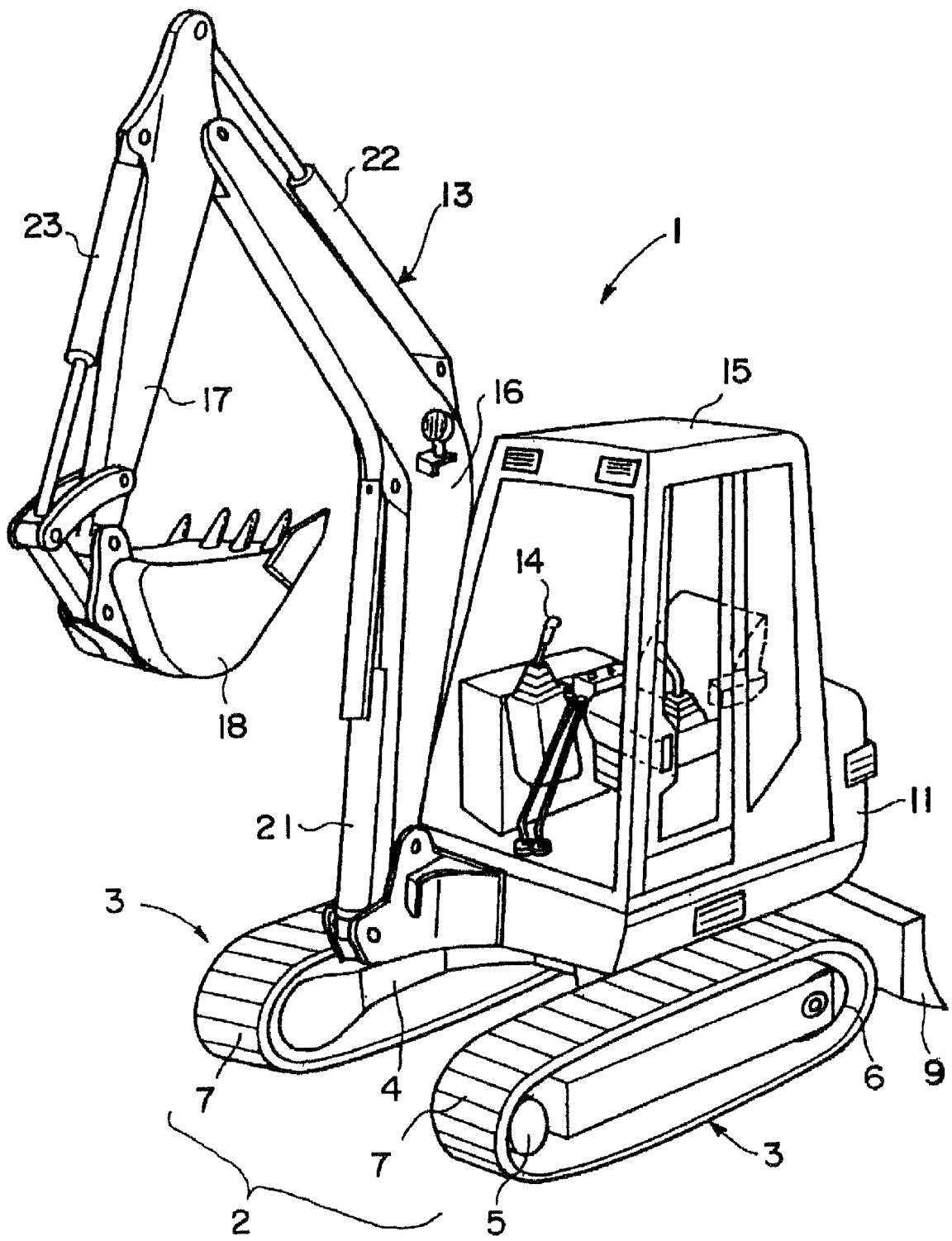
FIG. 1 is a perspective diagram showing the constitution of a crawler type power shovel as an example of a working vehicle according to the present invention.

First, a crawler type power shovel 1 is explained as an example of a working vehicle according to the present invention, using FIG. 1. This power shovel 1 is intended to be used in comparatively enclosed spaces such as underground and the like, and operates by using electrical power from a battery (hereafter referred to as a main battery 50*a*). The power shovel 1 includes a travel bogey 4 that forms a travel device 2, a blade 9 provided to the rear of the travel bogey 4 that is capable of swiveling vertically, a rotation platform 11 that is capable of rotating provided above the travel bogey 4, a power shovel mechanism 13 swivelably connected to the front of the rotation platform 11, and an operator's cabin 15 provided above the rotation platform 11.

The travel device 2 includes the approximately H-shaped travel bogey 4, and a travel mechanism 3 provided on the left and right of the travel bogey 4. The travel mechanism 3 includes a drive sprocket wheel 5 provided to the front and an idler wheel 6 (on occasions the drive sprocket wheel 5 and the idler wheel 6 will be referred to collectively as the "crawler wheels") provided to the rear on the left and right of the travel bogey 4, and a pair of left and right crawler tracks 7 wound around the two wheels 5, 6. Each of the drive sprocket wheels 5 is driven by left and right drive motors (hydraulic motors), which are not shown on the drawings, so that the power shovel 1 can move. Also, the rotation platform 11 can be rotated relative to the travel bogey 4 by a rotation motor (hydraulic motor), which is not shown on the drawings.

Figure 2:
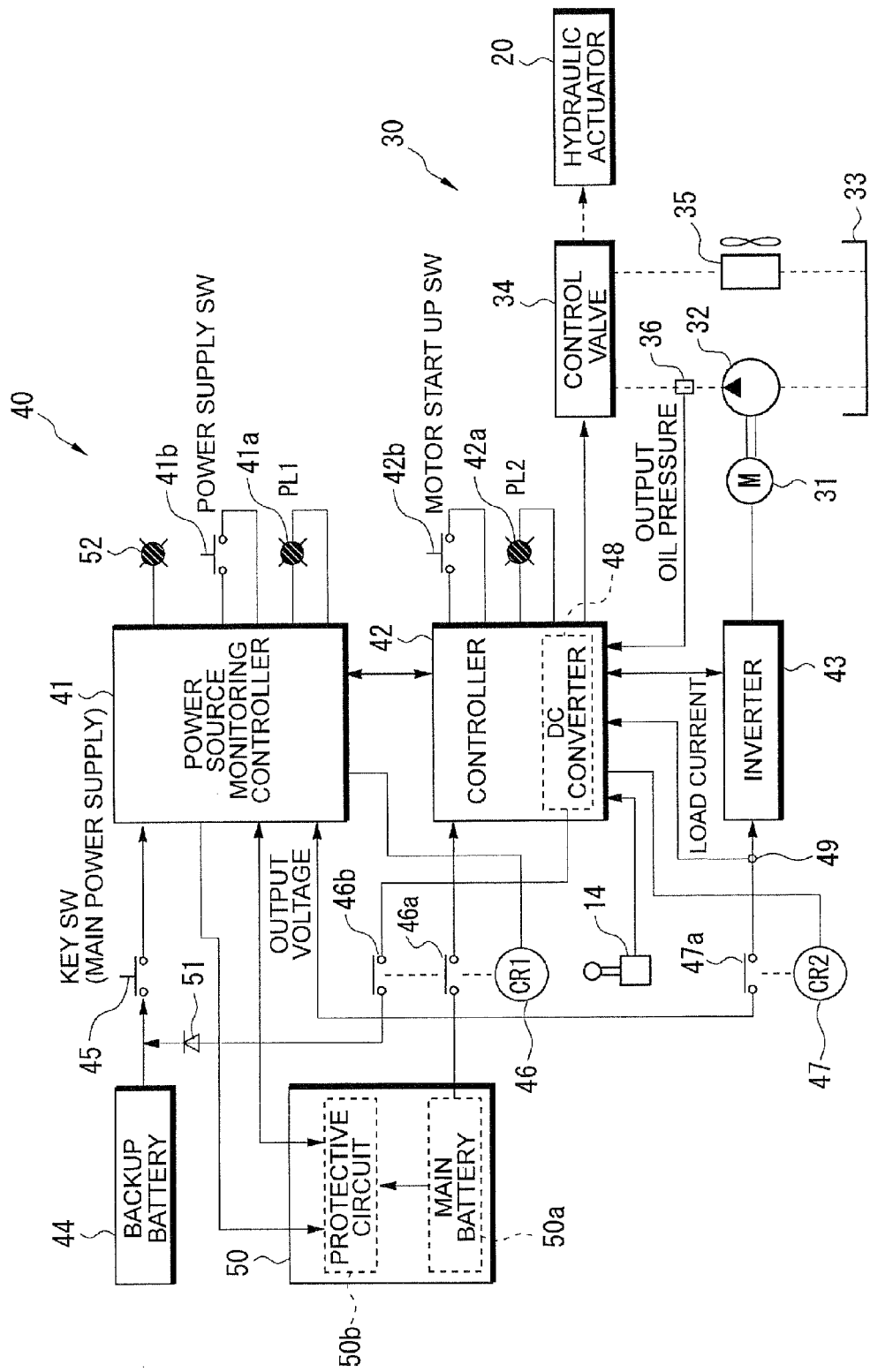
FIG. 2 is a block diagram showing the constitution of the hydraulic unit and power supply unit in the above power shovel.

The power shovel mechanism 13 includes a boom 16 swivelably connected to the front of the rotation platform 11 so that the boom 16 can be freely raised and lowered, an arm 17 swivelably connected to the top of the boom 16 so that the arm 17 can be freely swiveled vertically in the plane of vertical movement of the boom 16, and a bucket 18 connected to the top of the arm 17 so that the bucket 18 can be freely swiveled. The boom 16 is raised and lowered by a boom cylinder 21, the arm 17 is swiveled by an arm cylinder 22, and the bucket 18 is swiveled by a bucket cylinder 23. The cylinders and the drive motors referred to above and the rotation motor are driven by hydraulic oil supplied from a hydraulic unit 30, as shown in FIG. 2, so in the following explanation, these are collectively referred to as the "hydraulic actuator 20". Also, operation of the power shovel mechanism 13 is carried out using an operating device 14 provided within the operator's cabin 15.

The hydraulic unit 30 includes an electric motor 31, a hydraulic pump 32 that is driven by the electric motor 31 and that outputs hydraulic oil at a specific oil pressure and flow rate, a tank 33 in which hydraulic oil accumulates, a control valve (electromagnetic proportional valve) 34 that controls the supply of hydraulic oil output from the hydraulic pump 32 to the hydraulic actuator 20 in a supply direction and supply flow rate in accordance with the manipulation of the operating device 14, and an oil cooler 35 that cools the hydraulic oil whose temperature has risen. Operation signals output from the operating device 14 are input to a controller 42, which is described later, and the controller 42 outputs command signals to the control valve 34 in accordance with the operation signals such that the control valve 34 is controlled.

Direct current electric power supplied from the main battery unit 50 is converted into alternating current electric power having a predetermined voltage and frequency by an inverter 43 and supplied to the electric motor 31. A main battery unit 50 is constituted by a lithium ion battery, and includes a main battery 50*a* capable of outputting direct current high voltage (for example, direct current 336V), and a protective circuit 50*b* that obtains the status of and protects the main battery 50*a*.

Next, a power supply system 40 that supplies electrical power to the electric motor 31 using the main battery unit 50 is explained. The power supply system 40 includes a power source monitoring controller 41 that monitors the output voltage and status of the main battery unit 50, and a controller 42 that controls the inverter 43 and the control valve 34 to operate electric motor 31 and hydraulic actuator 20, as well as connecting and disconnecting the electric power supplied to the inverter 43.

In order to operate the power source monitoring controller 41 when starting the power shovel 1, the power supply system 40 includes a backup battery 44 that is constituted by a lithium ion battery that outputs a direct current voltage (for example, 12.6V direct current) for operating this the power source monitoring controller 41, and the backup battery 44 and the power source monitoring controller 41 are connected and disconnected by a key switch (main power supply switch) 45 provided within the operator's cabin 15. The power source monitoring controller 41 supplies electric power from the backup battery 44 to the protective circuit 50*b* of the main battery unit 50, and obtains the status of the main battery 50*a* from the protective circuit 50*b*.

The main battery 50*a* of the main battery unit 50 is connected to and supplies electric power to the controller 42 and the inverter 43. The main battery 50*a* and the controller 42 are connected by a first contact point 46*a* of a first relay 46, so the connection between the main battery 50*a* and the controller 42 is made and broken by the first relay 46. Also, the main battery 50*a* and the inverter 43 are connected by a contact point 47*a* of a second relay 47, so the connection between the main battery 50*a* and the inverter 43 is made and broken by the second relay 47. The controller 42 includes a DC-DC converter 48 that converts high voltage direct current voltage supplied from the main battery 50*a* into a low voltage direct current voltage (the voltage for operating the power source monitoring controller 41), the output of the DC-DC converter 48 is connected between the backup battery 44 and the key switch 45 via a protective diode 51, in other words, connected to the power source monitoring controller 41 and the backup battery 44, and these connections are made and broken by a second contact point 46*b* of the first relay 46.

The first and second contact points 46*a*, 46*b* of the first relay 46 are connected and disconnected by the control of the controller 41. The first and second contact points 46*a*, 46*b* are normally maintained disconnected (OFF state), and when a voltage is applied to the first relay 46 from the power source monitoring controller 41 the first and second contact points 46*a*, 46*b* are turned ON, and when the contact points 46*a* and 46*b* are connected, the main battery 50*a* and the controller 42, as well as DC-DC converter 48 and the power source monitoring controller 41 and a backup battery 44 are connected. When the second contact point 46*b* of the first relay 46 is connected, electric power is supplied to the DC-DC converter 48 by the power source monitoring controller 41, and the backup battery 44 is charged. Also, the contact point 47*a* of the second relay 47 is connected and disconnected by the control of the controller 42. The contact point 47*a* is normally in the disconnected state (OFF state), and when a voltage is applied to the second relay 47 from the controller 42 the contact point 47*a* is turned ON, the contact point 47*a* is connected, and the main battery 50*a* and the inverter 43 are connected.

The output values of a hydraulic pressure sensor 36 that measures the output pressure of the hydraulic pump 32 provided in the hydraulic unit 30, and the measured values of a current sensor 49 that measures the load current supplied to the inverter 43 from the main battery 50*a* are input to the controller 42. Also, the power source monitoring controller 41 includes a first pilot lamp 41a that indicates the ON state of the first relay 46, in other words, the state in which electric power is being supplied to the controller 42, and a power supply switch 41b that turns the first relay 46 ON when pressed while the first relay 46 is in the OFF state, and a warning pilot lamp 52 for notifying that a fault has arisen in the main battery unit 50. Further, the controller 42 includes a second pilot lamp 42a that indicates the ON state of the second relay 47, in other words, indicates that electric power is being supplied to the inverter 43, and a motor start up switch 42b which when pressed while the second relay 47 is in the OFF state turns the second relay 470N. The first and second pilot lamps 41a, 42a, the warning pilot lamp 52, the electric power switch 41b, and the motor start up switch 42b are disposed within the operator's cabin 15.

Figure 3:
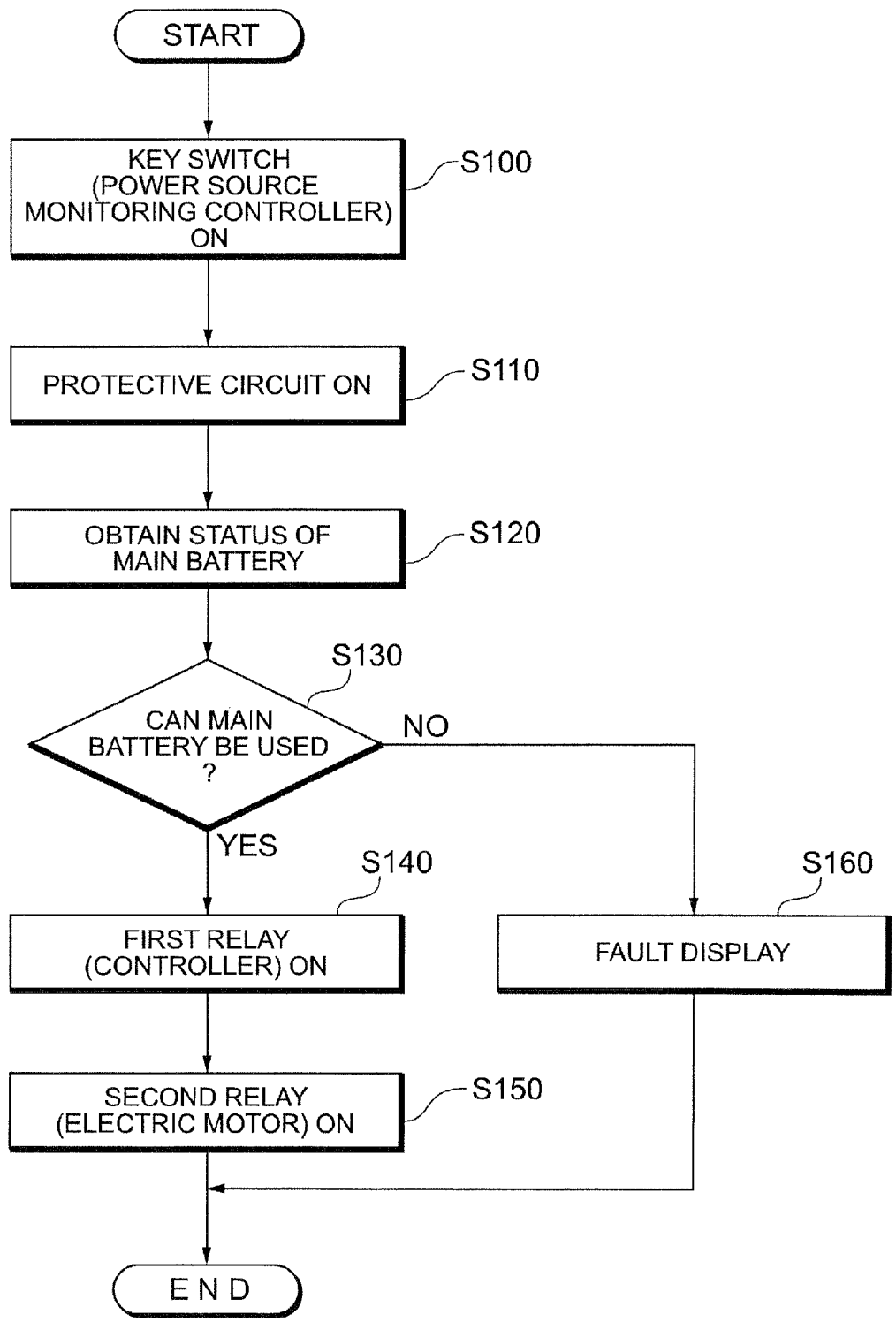
FIG. 3 is a flowchart showing the electric power start up process of the power supply unit.

Next, control of the electric power supply by the power supply system 40 is explained using FIG. 3. First, the power supply start up process is explained. When the operator positioned in the operator's cabin 15 turns on the key switch 45, which is disposed within the operator's cabin 15, electric power is supplied from the backup battery 44 to the power source monitoring controller 41, and the power source monitoring controller 41 starts up (step S100). The power source monitoring controller 41 first supplies electric power to the protective circuit 50b of the main battery unit 50 to start up the protective circuit 50b, and the protective circuit 50b starts and obtains the status of the main battery 50a (step S110). Then the power source monitoring controller 41 obtains the status of the main battery 50a from the protective circuit 50b (step S120), and determines whether the main battery 50a can be used or not (step S130). For example, if the main battery 50a is excessively discharged or the like, it is determined that the main battery 50a cannot be used, so the power source monitoring controller 41 lights the warning pilot lamp 52, and the power supply start up process is terminated (step S160).

On the other hand, when it is determined that the main battery 50a is in the normal state and can be used, the power source monitoring controller 41 turns the first relay 46 ON, and electric power is supplied from the main battery 50a to the controller 42, so the controller 42 is started, and the first pilot lamp 41a is lit (step S140). As stated above, when the first relay 46 is in the ON state, electric power is supplied from the DC-DC converter 48 to the power source monitoring controller 41 and the backup battery 44, and subsequently the power source monitoring controller 41 operates with electric power supplied from the DC-DC converter 48, and charging of the backup battery 44 starts.

Finally, when the controller 42 has started, the controller 42 turns the second relay 470N, electric power is supplied from the main battery 50a to the inverter 43, the inverter 43 is controlled to supply the electric motor 31 with alternating current electric power at a predetermined voltage and frequency, the electric motor 31 starts up, the second pilot lamp 42a is lit (step S140), and the electric power startup process of the power supply system 40 is terminated.

Figure 4:
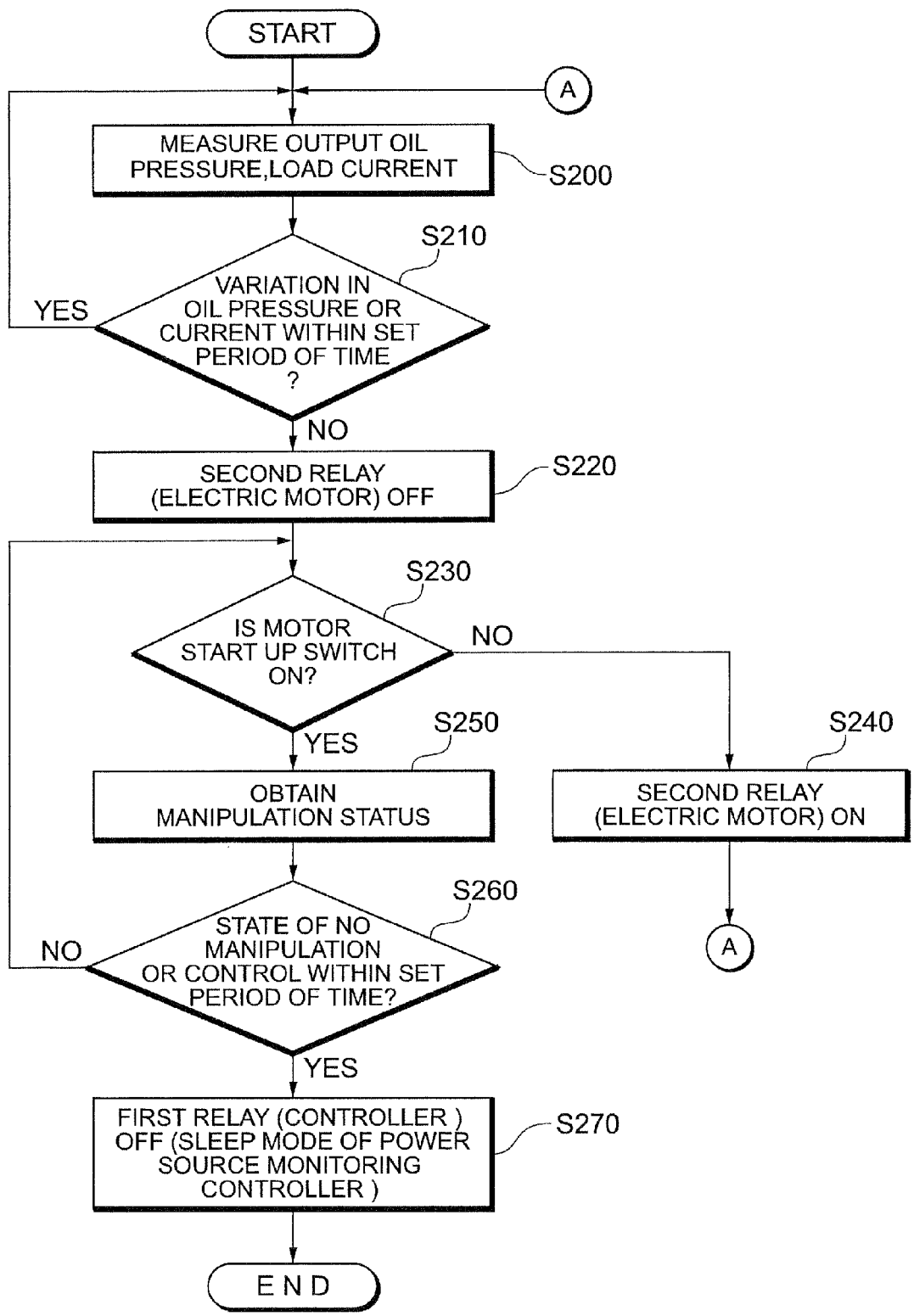
FIG. 4 is a flowchart showing the electric power saving control in the power supply unit.

Next, the electric power saving control by the power supply system 40 is explained using FIG. 4. The electric power saving control is a control to prevent waste of electric power in the charged main battery 50a when it is not necessary to supply hydraulic oil to the hydraulic actuator 20, by stopping the electric motor 31, and stopping the controller 42. FIG. 4 shows the control by the controller 42, and when the power supply start up process has terminated as described above, the electric power saving control is started. Also, the symbol A enclosed within a circle appealing after step S240 in FIG. 4 means go to and connect with the symbol A enclosed within a circle appearing immediately after Start.

The controller 42 measures the output oil pressure and the load current using the hydraulic pressure sensor 36 and the current sensor 49 (step S200). Then, it is determined whether within a set period of time (for example, five seconds) the output pressure or the load current have varied (step S210), if there is a variation, the procedure returns to step S200 and repeats this process. On the other hand, when there is no variation in the output pressure and the load current within the set period of time, the controller 42 turns the second relay 47 off, so the power supply to the inverter 43 is disconnected, the electric motor 31 stops, and the second pilot lamp 42a is turned off (step S220).

Next, the controller 42 determines whether the motor start up switch 42b is turned ON or not (step S230). When it is determined that the motor start up switch 42b is ON, the second relay 47 is turned ON, the electric motor 31 is started by supplying electric power to the inverter 43, and the second pilot lamp 42a is lit (step S240). Then, the procedure returns to step S200, and the above process is repeated. At step S230, when it is determined that the motor start up switch 42b is not on, the controller 42 obtains the state of manipulation of the operating device 14 or the like (step S250), determines whether within a set period of time there has been a state of no manipulation or control (step S260), and when there has not been a state of no manipulation or control the procedure returns to step S230 and this process is repeated.

At step S230, when it is determined that the state of no manipulation or control has continued during the set period of time, the controller 42 transmits a command signal to the power source monitoring controller 41 (step S270). Then, when the power source monitoring controller 41 receives the command signal from the controller 42, the first relay 46 is turned off, the electric power supply to the controller 42 is turned off and the controller 42 is stopped, first pilot lamp 41a is turned off, the electric power supply to the protective circuit 50b of the main battery unit 50 is stopped, and the sleep mode is activated.

When the sleep mode is activated, the power source monitoring controller 41 stops operation except for monitoring whether the power supply switch 41b has been pressed, so the electric power consumption of the backup battery 44 is minimized as much as possible. Then, when it is detected that the power supply switch 41b has been pressed, the power source monitoring controller 41 terminates the sleep mode, implements the process from step S110 in the power supply start up process shown in FIG. 3, the first and second relays 46, 47 are turned on, electrical power is supplied to the controller 42 and the inverter 43, and the electric motor 31 is started.

In this way, by providing the power source monitoring controller 41 that controls the supply of electric power to the inverter 43 separately from the controller 42, monitors the main battery unit 50, as well as controls the supply of electric power to the controller 42, and the backup battery 44 that allows the power source monitoring controller 41 to operate even when electric power is not supplied from the main battery unit 50, even if a fault arises in the main battery 50a, this fault is detected by the power source monitoring controller 41 and it is possible to provide a warning using the warning pilot lamp 52 or the like, so it is possible to make the operator that is operating the power shovel 1 immediately aware of the fault in the main battery unit 50.

At this time, the process when electric power is turned ON as described above is capable of turning on the power supply in turn starting with the power source monitoring controller 41, so it is possible to simplify the process and constitution of the power source monitoring controller 41 and the controller 42. Also, when electric power is supplied to the controller 42 when the main battery 50*a* is in a normal state, and at the same time the power source monitoring controller 41 is operated by the main battery 50*a* and the backup battery 44 is charged, if a fault arises in the main battery 50*a*, the power source monitoring controller 41 can be operated by the backup battery 44.

Further, the supply state of hydraulic oil to the hydraulic actuator 20 and the manipulation state of the operating device 14 are monitored by the controller 42, and when oil pressure is not necessary the electric power supply to the inverter 43 is stopped, and further the electric power supply to the controller 42 is stopped, so unnecessary power consumption from the main battery 50*a* is minimized, and it is possible to lengthen the time that the power shovel 1 can carry out work without charging the main battery unit 50. Even when the power supply to the inverter 43 and the controller 42 is stopped in this way, by pressing the motor start up switch 42*a* or the power supply switch 41*a*, it is possible to simply supply electric power to the inverter 43 and the controller 42.

What is claimed is:

1. A working vehicle operated by a hydraulic actuator, comprising:
   a hydraulic pump that outputs hydraulic oil for operating the hydraulic actuator;
   an electric motor that drives the hydraulic pump;
   a main battery that supplies direct current electric power;
   an inverter that operates the electric motor by converting the direct current electric power from the main battery into alternating current electric power and supplying the alternating current electric power to the electric motor;
   an electric motor relay that makes and breaks the connection between the main battery and the inverter;
   an operating device for operating the hydraulic actuator;
   a controller which is operated by the direct current electric power from the main battery, and which controls the operation of the hydraulic actuator and the inverter in accordance with operation signals output from the operation device, and makes and breaks the connection between the main battery and the inverter in use of the electric motor relay;
   a controller relay that makes and breaks the connection between the main battery and the controller;
   a power source monitoring controller that monitors the state of the main battery, and that makes and breaks the connection between the main battery and the controller in use of the controller relay;
   an oil pressure sensor for measuring the output oil pressure of the hydraulic oil output from the hydraulic pump; and
   a current sensor for measuring the value of the load current flowing from the main battery to the inverter wherein configuration is employed to execute:
   a first step in which the controller, when determination is made that there has been no variation in the magnitude of the output oil pressure measured by the oil pressure sensor and the load current measured by the current sensor within a set period of time, breaks the connection between the main battery and the inverter and stops the motor in use of the electric motor relay;
   a second step in which the controller, when determination is made that the state where no operating signal has been output from the operating device has continued during a predetermined set period of time, transmits a command signal to the electrical power monitoring controller; and
   a third step in which the power source monitoring controller, when the transmitted signal is received, breaks the connection between the main battery and the controller in use of the controller relay, and stops the controller.

2. The working vehicle according to claim 1, wherein
   the controller has a motor start up switch, and
   in the second step, the controller, when determination is made that the motor start up switch has been operated, connects the main battery and the inverter in use of the electric motor relay, and starts the electric motor in order to return to the first step.

3. The working vehicle according to claim 1 or claim 2, wherein
   the power source monitoring controller has a power supply switch, and
   in the third step, after stopping the controller, the power source monitoring controller, when determination is made that the power supply switch has been operated, connects the main battery to the controller and the inverter using the controller relay and the electric motor relay in that order.

* * * * *